W. SNEE & J. A. SNEE, Jr.
UTILIZING VARIABLE POWER.
APPLICATION FILED SEPT. 16, 1912.
1,131,435.
Patented Mar. 9, 1915.
2 SHEETS—SHEET 2.
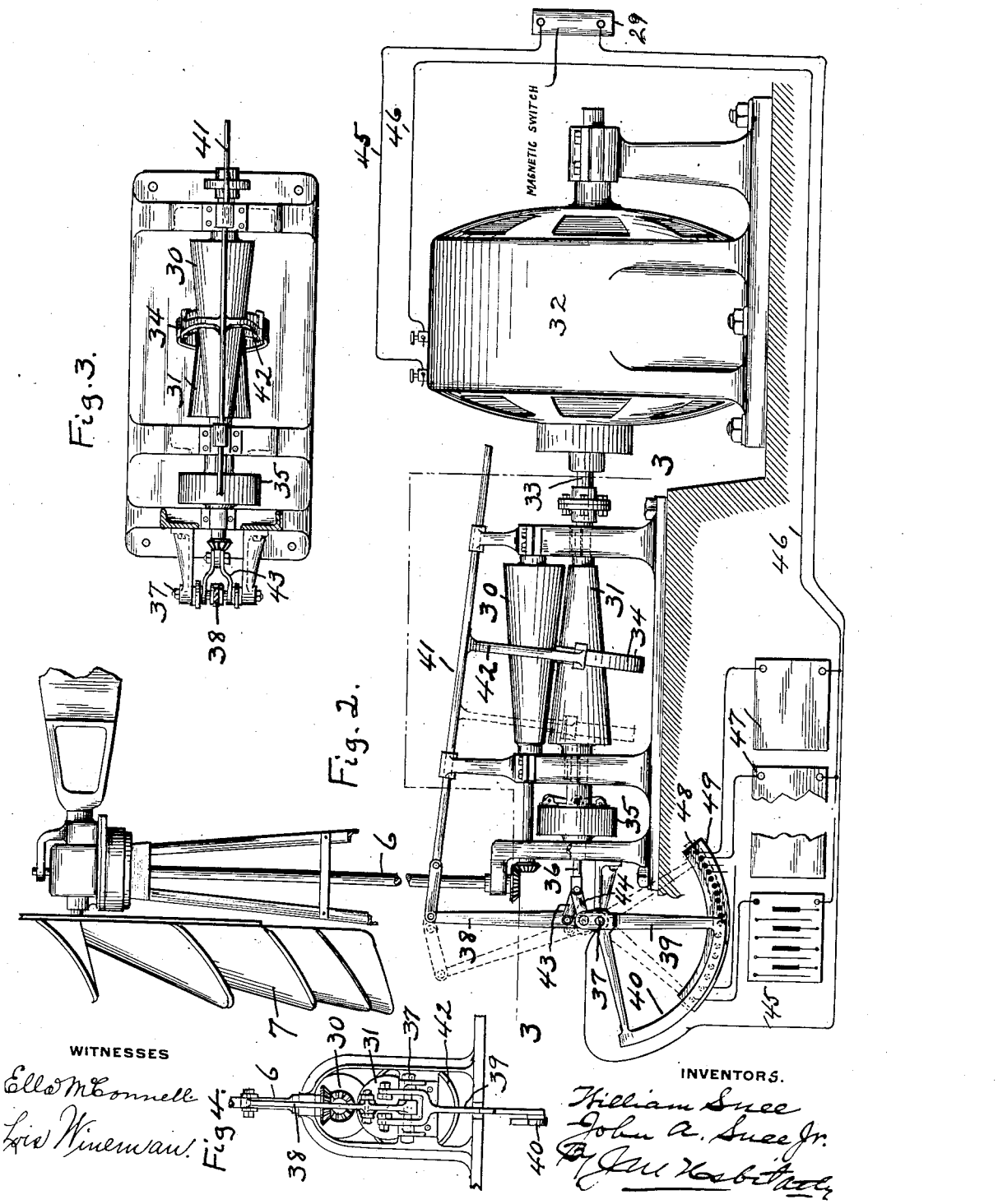

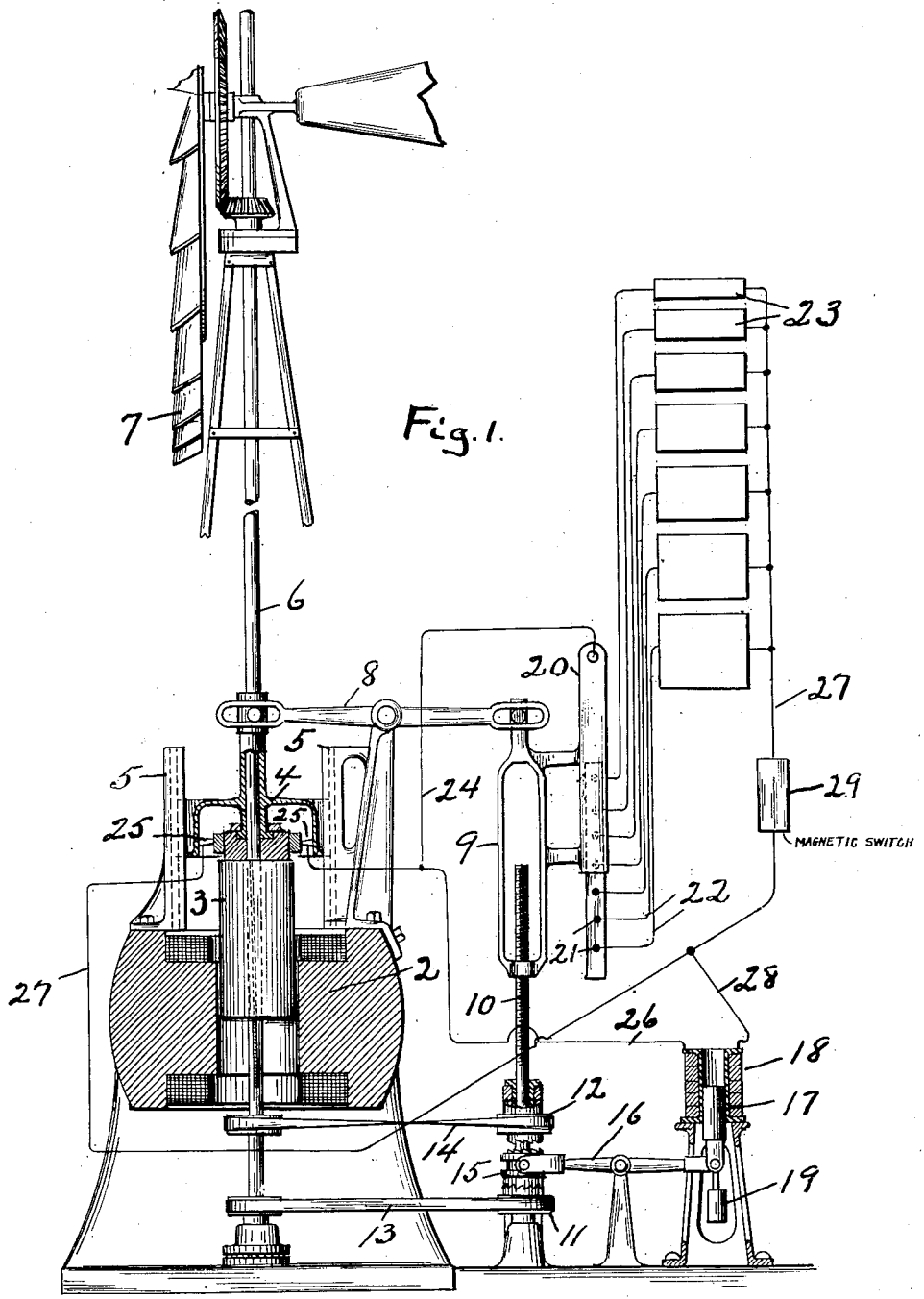

UNITED STATES PATENT OFFICE.

WILLIAM SNEE AND JOHN A. SNEE, JR., OF WEST ELIZABETH, PENNSYLVANIA.

UTILIZING VARIABLE POWER.

1,131,435.   Specification of Letters Patent.   Patented Mar. 9, 1915.

Application filed September 16, 1912. Serial No. 720,545.

*To all whom it may concern:*

Be it known that we, WILLIAM SNEE and JOHN A. SNEE, Jr., residents of West Elizabeth, in the county of Allegheny and State of Pennsylvania, have invented certain new and useful Improvements in Utilizing Variable Power, of which the following is a specification.

The primary object of the invention is to convert all available energy in wind or other sources of variable power into useful power which is immediately available, or which may be stored for future use.

A further purpose is to provide energy, derived from a source of variable power, which is of substantially constant or uniform tension, i. e., voltage or pressure, regardless of variations in its quantity or volume, the latter varying automatically with the intensity or velocity of the wind or other power source whereby all the available energy is directed into a stream of uniform tension but of varying volume, the latter rising and falling with corresponding variations in the initial power, and the quantity of the converted power representing at all times the maximum energy of the prime mover.

A great diversity of forms of apparatus may be utilized for practising the invention and for the accomplishment of many kinds of useful work. We do not undertake herein to define all such uses nor all forms of apparatus that may be provided for practising the same. For the purpose of illustration we do show embodiments in which the variable power of a prime mover is converted into electrical energy, with means for maintaining substantially constant voltage with variations in the current flow determined and regulated automatically by intensity or velocity variations of the prime power. In the adaptation here shown the power converting mechanism is embodied in an electrical generator, together with means for varying the load, the latter being light when the initial power is low and relatively heavy with increased primary power.

In the accompanying drawings, Figure 1 illustrates diagrammatically, partly in section, a form of apparatus in which the generator armature is connected directly to the power shaft of a wind wheel, always rotating at the speed of said shaft. Fig. 2 is a form of apparatus in which mechanism is interposed between the power shaft of the wind wheel and the generator whereby the latter is operated at substantially uniform speed. Fig. 3 is a top plan partly in section of a portion of the mechanism shown in Fig. 2, taken on line 3—3 of said view. Fig. 4 is an end elevation of the mechanism shown in Fig. 2.

Referring to Fig. 1, 2 designates the field of an electric generator, and 3 is the armature thereof which is secured to cross head 4 movable in guides 5. Armature 3 rotates with and is movable vertically on power shaft 6 of wind wheel 7, being raised and lowered thereon by lever 8 which is connected by buckle 9 with screw shaft 10. Carried by shaft 10 are two loose pulleys 11 and 12, the former geared to windmill shaft 6 by straight belt 13, while pulley 12 is geared to said shaft by the crossed belt 14. Movable on and rotatable with shaft 10 between and common to pulleys 11 and 12 is clutch head 15 carried by one end of lever 16, while secured to the opposite end of said lever is core 17 of solenoid 18, the core being weighted as indicated at 19. Secured to and hence movable with buckle 9 in contact bar 20 which is adapted to move progressively over a series of contacts 21, each of which is connected by a wire 22 to a storage battery 23. A wire 24 connected to one of the generator brushes 25 extends to contact bar 20, with a branch 26 thereof leading to the coil of solenoid 18. Another wire 27 extends from the other generator brush 25 to and is connected with the several storage batteries, with a branch 28 thereof connected to the solenoid core. It is well known that the electromotive force of a generator is proportional to the number of magnetic lines of forces cut by the armature in unit time, the number depending upon the speed of the armature and the extent of its area exposed to the field poles. This principle is utilized in the present adaptation of the invention. The solenoid which constitutes the governor determines the position of the armature and the extent of its surface exposed to the field, the coil of the solenoid being directly connected to the generator and energized by the potential of the latter. In the absence of abnormal potential clutch 15 is balanced between and out of engagement with either of pulleys 11 and 12. If the potential rises, core 17 lifts weight 19 and connects the clutch with pulley 11, as shown in Fig. 1, with the result that screw shaft 10 is rotated, buckle 9 and contact 20 lowered and armature 3 raised so that a decreased number of lines of forces are cut by the latter and at the same time more batteries 23 are connected to the generator to such an extent that they exactly take care of the increased supply of energy (in the present adaptation storing it) at the same time maintaining its voltage constant. A reverse operation results if the potential lowers, solenoid core 17 dropping and engaging clutch 15 with pulley 12, which results in the windmill shaft 6 driving screw shaft 10 in a reverse direction, thereby lowering the armature and causing it to cut a larger number of lines of force and at the same time raising contact bar 20 and decreasing the number of batteries in circuit with the generator. A non-return device 29, of which a number of designs are known in the art, for instance a magnetic switch, is interposed in the circuit for preventing back flow into the generator when the potential is as low or lower than that at which the batteries will discharge. The batteries are preferably of increasing size, with the smaller units available for the lower energy supply and increasing in capacity as the supply of energy increases. The present invention is not concerned with means for making the batteries available for dispensing the stored energy.

It will be understood that the storage batteries here shown comprise only one of various forms of apparatus that may be utilized for receiving generated energy, it being immaterial in the broad aspect of the invention whether the energy is stored or at once utilized.

In the adaptation illustrated in Fig. 2, co-operating friction cones 30 and 31 are interposed between the variable prime mover, in the present instance wind wheel 7, and the armature of generator 32, cone 30 being geared to the wind wheel shaft 6, and cone 31 mounted on the armature shaft 33. The friction cones are connected by belt 34 which embraces cone 31, with means for shifting the belt between the cones. This form of speed regulating mechanism and its principle of operation are old and well known. Carried by armature shaft 33 is a centrifugal governor 35 of usual or any preferred construction which is adapted to move outwardly and extend its stem or shaft 36 when the speed increases slightly and retract the same when the speed decreases. Separately mounted on fulcrum 37 is the upwardly extending lever 38 and the downwardly extending arm 39, the latter carrying contact plate 40 which is preferably of segmental form. Lever 38 is connected to sliding rod 41, and secured to this rod is yoke 42 which embraces and shifts belt 34 between the cones, lever 38 being connected to the governor stem by the links 43. Similar links 44 connect said stem with arm 39 of the contact plate. One of the circuit wires 45 from the dynamo extends to contact carrying arm 39 and the other line 46 of the circuit is connected with storage batteries 47 (only a few of the batteries being shown) which are connected respectively to contact points 48 on the fixed contact carrier 49, the contacts being arranged in a curved line complementary with curved contact plate 40. In this adaptation of the invention the dynamo or generator is rotated at substantially uniform speed regardless of speed variations of the wind wheel. When the belt is centrally positioned as in full lines in Fig. 2 the interposed speed changing mechanism is neutral, the speed of the wind wheel being communicated directly to the generator. Upon increase of speed of the wind wheel belt 34 is shifted by the governor to the left, a maximum speed carrying it to the dotted line position, the range of movement of the governor being sufficient to accomplish this without appreciably increasing the speed of the generator. Thus, with an increasing speed an increasing number of batteries is placed in the generator circuit, taking care of the increased energy supply or load in exact proportion to the quantity thereof, with the voltage remaining substantially constant. Obviously, with a decrease of power from the prime mover, the cone belt is shifted to the right by the inward movement of governor stem 36, progressively uncovering contact points 48 and disconnecting the batteries in such number as will maintain the voltage substantially constant.

While the invention is not confined to utilizing the wind motor as a prime mover, it is peculiarly adapted to the power variations of the wind motor as it makes available all the energy obtainable from this source of power. The energy of wind is solely kinetic, and kinetic energy is proportional to the square of the velocity. But since the quantity of air passing the wheel is proportional to the wind velocity in unit time, the amount of energy passing in unit time is proportional to the cube of the wind velocity. It is well understood that for the best efficiency, the number of revolutions of a given wheel must bear a constant ratio to the velocity of the wind, such ratio depending upon the size and design of the wheel. From this it follows that when the wind blows twice as fast as before, the wheel should run twice as fast as before and should do two cubed or eight times the work as before in order to run at best efficiency. These conditions are recognized in embodying the adaptations here shown and may be realized with each of the illustrated mechanisms. While the rule of the cubes as above stated need not be complied with exactly, a close proximation thereto results in the best economy. Applying the rule to the construction shown in Fig. 2, if the ratio of transmission at the extreme right of the cones is 2 to 1, and in the middle position shown is 1 to 1, and in the extreme left hand position indicated by dotted lines is 1 to 2, then the loads imposed upon the generator in the respective three positions should vary as 1 to 8 to 64.

While in the embodiments here shown the energy converting device is an electric generator and the storing means consists of storage batteries, it will be understood that the invention is not restricted thereto as the derived maximum energy may be variously translated or converted and variously stored, or the energy may be immediately utilized. Nor is the invention restricted to the forms or types of governors here shown, as any governing means may be utilized that will proportion or adjust the load to a variable energy supply.

We claim:—

1. The combination of a variable power prime mover, an electric generator geared to the prime mover, regulating means for maintaining the generated current at a constant voltage, and means actuated by the generated electromotive force for maintaining a constant predetermined balance between the current output and the available variable power.

2. A generator actuated by variable energy, means for maintaining substantially constant the voltage of the generator, and means for adjusting the load on the generator to the available energy supply.

In testimony whereof we affix our signatures in presence of two witnesses.

WILLIAM SNEE.
JOHN A. SNEE, Jr.

Witnesses:
W. TRINKS,
W. A. POST.